April 12, 1938.  D. W. VOORHEES, JR  2,114,133

PIVOTAL AXLE FOR STEEL FARM TRUCKS

Filed July 24, 1936

Patented Apr. 12, 1938

2,114,133

UNITED STATES PATENT OFFICE 2,114,133

PIVOTAL AXLE FOR STEEL FARM TRUCKS

Daniel W. Voorhees, Jr., Peru, Ill.

Application July 24, 1936, Serial No. 92,285

1 Claim. (Cl. 280—96.1)

This invention is directed to farm trucks or wagons of steel construction and particularly to the pivotal axles which carry the front wheels.

The principal object of the invention is to provide a pivotal axle that is light in weight yet very strong.

Another object is to provide a structure utilizing low cost materials and particularly the same kinds of materials that are common in truck manufacture of this class, so as to minimize the materials inventory investment.

A still further object is to provide a design that may be manufactured with the same machinery and tools that are available in factories of this kind to thus avoid increased investments in machinery.

And finally the overall objective is to provide a light, strong and cheap axle with minimum manufacturing investment.

Figure 1:
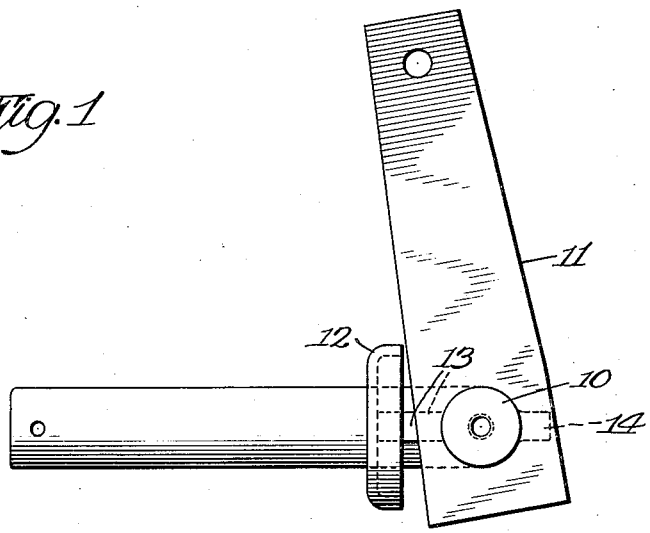
Fig. 1 is a plan view of the pivotal axle.
Figure 2:
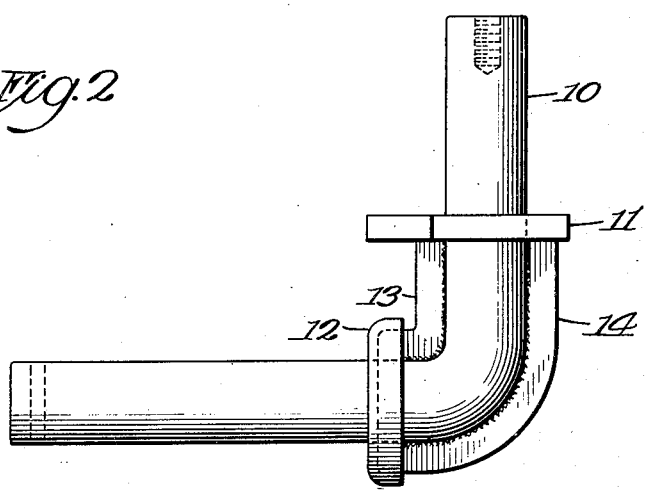
Fig. 2 is an elevation view.

My pivotal axle is a novel combination of elements including a bent piece of round steel bar 10 provided with a tapped hole in its upper end to take a cap screw for holding a retaining washer and a cross hole on its lower end to take a cotter pin or key to hold on the wheel hub.

A steel radius arm 11 is welded in position on the vertical section of the arm 10 to take the axle load and provide a swivel surface as well as to perform the function of radius arm.

Another steel washer 12 is welded on the horizontal section of the axle to take the thrust of the wheel hub and to provide and seal against dirt and dust. Stiffener members 13 and 14 are welded in position between the washer 12 and the radius arm 11 to provide structural strength at the bend of the axle which is the point of greatest stress and which permits the use of a lighter axle than would otherwise be possible without such stiffener members.

Having thus described my invention, what I now claim as new is:

An axle for a farm truck comprising, a cylindrical bar having a substantially right angular bend intermediate its ends to provide a wheel receiving axle portion and a pivot portion, a radius arm secured by one end portion to said pivot portion and providing a shoulder extending substantially completely about said pivot portion and transversely of the axis thereof, said shoulder being spaced from said bend, a washer secured to said axle portion to provide a substantially circumferential shoulder transversely of said axle portion and in spaced relation from said bend, and a pair of stiffener members of relatively narrow flat stock bent edgewise to conform to the curvature of said bar bend at the inside and outside radii thereof, each of said stiffener members being abutted against and welded to said washer and radius arm shoulders at its ends, one of said stiffener members being secured edgewise to said bar along the inside curved surface of the bend thereof and the other of said stiffener members being similarly secured along the outside curved surface of the bend.

DANIEL W. VOORHEES, JR.